US012747186B2

(12) United States Patent
Yang

(10) Patent No.: US 12,747,186 B2
(45) Date of Patent: Sep. 29, 2026

(54) METHOD FOR MANUFACTURING LOW-EMISSIVITY EASY-CLEAN GLASS, LOW-EMISSIVITY EASY-CLEAN GLASS, AND LOW-EMISSIVITY EASY-CLEAN COMPOSITE GLASS

(71) Applicant: ZIRCO APPLIED MATERIALS CO., LTD, Taoyuan City (TW)

(72) Inventor: Shiou-Sheng Yang, Taoyuan City (TW)

(73) Assignee: ZIRCO APPLIED MATERIALS CO., LTD, Taoyuan City (TW)

( * ) Notice: Subject to any disclaimer, the term of this patent is extended or adjusted under 35 U.S.C. 154(b) by 112 days.

(21) Appl. No.: 18/796,645

(22) Filed: Aug. 7, 2024

(65) Prior Publication Data

US 2026/0008721 A1 Jan. 8, 2026

(30) Foreign Application Priority Data

Jul. 4, 2024 (TW) ................................ 113125191

(51) Int. Cl.
*B32B 15/04* (2006.01)
*B32B 17/06* (2006.01)
*C03C 17/02* (2006.01)

(52) U.S. Cl.
CPC .......... *C03C 17/02* (2013.01); *C03C 2201/30* (2013.01); *C03C 2217/213* (2013.01); *C03C 2218/154* (2013.01)

(58) Field of Classification Search
CPC ........................ C03C 2201/30; C03C 2217/76
USPC ........................................ 428/426, 432, 434
See application file for complete search history.

(56) References Cited

U.S. PATENT DOCUMENTS

2023/0350103 A1* 11/2023 Tsuri ........................ G02B 1/18

FOREIGN PATENT DOCUMENTS

| | | |
|---|---|---|
| CN | 202378343 U | 8/2012 |
| CN | 202849261 U | 4/2013 |
| CN | 203284327 U | 11/2013 |
| CN | 212982795 U | 4/2021 |
| CN | 214083227 U | 8/2021 |

* cited by examiner

*Primary Examiner* — Lauren R Colgan
(74) *Attorney, Agent, or Firm* — Birch, Stewart, Kolasch & Birch, LLP

(57) ABSTRACT

A method for manufacturing low-emissivity easy-clean glass and the resulting low-emissivity easy-clean glass and low-emissivity easy-clean composite glass. The method involves using RF (Radio Frequency) sputtering of a silicon oxide target while simultaneously introducing nitrogen gas, and simultaneously using DC (Direct Current) sputtering of a silver target to co-deposit nitrogen-doped silicon oxide silver (Si, O, N: Ag) on a clear glass substrate. This low-emissivity easy-clean glass can avoid oxidation issues, improve conductivity, hardness, water contact angle, and reduce hemispherical emissivity.

20 Claims, 4 Drawing Sheets

METHOD FOR MANUFACTURING LOW-EMISSIVITY EASY-CLEAN GLASS, LOW-EMISSIVITY EASY-CLEAN GLASS, AND LOW-EMISSIVITY EASY-CLEAN COMPOSITE GLASS

BACKGROUND OF THE INVENTION

Field of Invention

The invention relates to a method for manufacturing glass and the resulting glass, specifically a method for manufacturing low-emissivity easy-clean glass and the resulting low-emissivity easy-clean glass.

Description of Related Art

Low-E glass (Low-Emissivity Glass) is a type of coated glass. Emissivity is the ability of a material to radiate absorbed heat. Low-E glass is primarily used in building windows to retain indoor heat or reflect outdoor heat, thereby reducing air conditioning energy usage.

The energy in typical sunlight consists of approximately 51.2% infrared heat, 46.8% visible light heat, and 2% ultraviolet and other rays. Low-E glass mainly uses metal medium films to block infrared and ultraviolet rays while allowing high transmittance in the visible light range (380 nm-760 nm), ensuring good lighting properties. By blocking heat entering the interior, it reduces indoor air conditioning energy consumption. Simultaneously, it significantly increases building comfort by reducing ultraviolet transmittance. Traditional coated glass and tinted glass primarily reflect and absorb visible light.

In other words, the Low-E coating layer transmits up to 80% of visible light, but its surface metal molecules reflect the far-infrared rays, which are the main factors of heat conduction in visible light, with a reflectivity of 70%~90%. Compared to ordinary glass, this greatly improves its optical performance, solving the contradiction between insulation performance and lighting performance. Low-E glass is widely used in residential and commercial windows, skylights, curtain walls, and sunshades, with significant success.

For example, in the Low-E glass manufacturing process using sputtering, metal, alloy, or metal oxide layers, including silver, copper, and tin, are coated on the glass surface to form glass products.

However, conventional Low-E glass generally suffers from a single color, lower oxidation resistance, and reduced damage resistance. Moreover, single-layer silver-coated Low-E glass, when used alone, easily oxidizes due to exposure to air, oxygen, and moisture. Therefore, it is often used in multi-layer or laminated structures.

For example, CN202849261U patent describes a seven-layer coating structure comprising, from bottom to top, tin oxide film layer, zinc oxide film layer, nickel-chromium film layer, silver film layer, nickel-chromium film layer, ceramic titanium dioxide film layer, and ceramic silicon nitride film layer, forming a corrosion-resistant, oxidation-resistant single silver Low-E coated glass. In short, this prior art uses dielectric layers as isolation, sandwiching the silver film layer, forming a seven-layer structure of corrosion-resistant, oxidation-resistant single silver Low-E coated glass.

Another example, CN203284327U patent, features a glass layer, a first medium layer, a second medium layer, a first shielding layer, a silver layer, a second shielding layer, and a third medium layer arranged sequentially from inside to outside. This prior art uses dielectric layers as isolation, sandwiching the silver film layer to achieve low-reflectivity golden offline Low-E coated glass.

Other patents, such as CN202378343U, CN202378343U, CN202378343U, CN212982795U, and CN214083227U, also use dielectric layers to isolate and sandwich the silver film layer.

However, these prior art methods result in decreased conductivity, hardness, and water contact angle, and increased hemispherical emissivity in Low-E glass.

Despite these advancements, traditional methods can lead to decreased conductivity, hardness, water contact angle, and increased hemispherical emissivity, necessitating further improvements.

Therefore, there is still a need for improvement in the prior art.

SUMMARY OF THE INVENTION

To solve the aforementioned and other problems, the primary objective of the present invention is to provide a method for manufacturing low-emissivity easy-clean glass and the resulting low-emissivity easy-clean glass to improve upon the prior art.

One objective of the present invention is to provide a method for manufacturing low-emissivity easy-clean glass and the resulting low-emissivity easy-clean glass, which improves conductivity compared to prior art.

Another objective of the present invention is to provide a method for manufacturing low-emissivity easy-clean glass and the resulting low-emissivity easy-clean glass, which improves hardness compared to prior art.

Another objective of the present invention is to provide a method for manufacturing low-emissivity easy-clean glass and the resulting low-emissivity easy-clean glass, which improves the water contact angle compared to prior art.

Another objective of the present invention is to provide a method for manufacturing low-emissivity easy-clean glass and the resulting low-emissivity easy-clean glass, which reduces hemispherical emissivity compared to prior art.

Another objective of the present invention is to provide a method for manufacturing low-emissivity easy-clean glass and the resulting low-emissivity easy-clean glass, which avoids oxidation issues while improving conductivity, hardness, and water contact angle, and reducing hemispherical emissivity.

To achieve the above and other objectives, an embodiment of the present invention provides a method for manufacturing low-emissivity easy-clean glass, comprising: using RF (Radio Frequency) sputtering of a silicon oxide target while simultaneously introducing nitrogen gas and using DC (Direct Current) sputtering of a silver target to co-deposit nitrogen-doped silicon oxide silver (Si, O, N: Ag) on a clear glass substrate.

Preferably, the method further comprises: annealing to obtain low-emissivity easy-clean glass, wherein the low-emissivity easy-clean glass has a nitrogen-doped silicon oxide silver (Si, O, N: Ag) thin film layered on the clear glass substrate.

Preferably, the method further comprises: using RF sputtering of a silicon oxide target while simultaneously introducing nitrogen gas and using DC sputtering of a silver target to co-deposit another layer of nitrogen-doped silicon oxide silver (Si, O, N: Ag) on the clear glass substrate.

Preferably, the method further comprises: annealing again to obtain low-emissivity easy-clean glass with two layers of nitrogen-doped silicon oxide silver (Si, O, N: Ag) thin films stacked on each other.

Preferably, the annealing step comprises: introducing oxygen and performing annealing.

Preferably, the clear glass substrate is 5 mm thick.

Preferably, the low-emissivity easy-clean glass has a hardness greater than 2H and a contact angle greater than 103 degrees.

Preferably, the low-emissivity easy-clean glass has a hardness greater than 5H and a contact angle greater than 110 degrees.

Preferably, the method further comprises: maintaining a vacuum of 2×10^−6 mmHg or below before sputtering.

Preferably, the method further comprises: maintaining a working pressure of nitrogen gas at 3.5~3.7×10^−3 mmHg during sputtering.

To achieve the above and other objectives, an embodiment of the present invention further provides a low-emissivity easy-clean glass, comprising: a first nitrogen-doped silicon oxide silver layer; and a glass layer, using the method for manufacturing low-emissivity easy-clean glass, wherein the first nitrogen-doped silicon oxide silver layer is co-deposited on the glass layer.

Preferably, the glass further comprises a second nitrogen-doped silicon oxide silver layer, wherein the second nitrogen-doped silicon oxide silver layer (22) is co-deposited on the first nitrogen-doped silicon oxide silver layer.

Preferably, the glass layer is 5 mm thick.

Preferably, the low-emissivity easy-clean glass has a hardness greater than 2H and a contact angle greater than 103 degrees.

Preferably, the low-emissivity easy-clean glass has a hardness greater than 5H and a contact angle greater than 110 degrees.

Preferably, the glass further comprises: a first transparent substrate layer; a second transparent substrate layer; a near-infrared shielding layer, positioned between the first transparent substrate layer and the second transparent substrate layer, the near-infrared shielding layer comprising multiple tungsten oxide nanoparticles fixed in polyethylene terephthalate (PET); a first protective layer, positioned between the first transparent substrate layer and the near-infrared shielding layer, the first protective layer being a polyethylene terephthalate layer; and a second protective layer, positioned between the second transparent substrate layer and the near-infrared shielding layer, the second protective layer being a polyethylene terephthalate layer.

Preferably, the first transparent substrate layer and the second transparent substrate layer are glass.

To achieve the above and other objectives, an embodiment of the present invention further provides a low-emissivity easy-clean composite glass, comprising: a first glass layer, the first glass layer being the low-emissivity easy-clean glass as described above; a second glass layer; and a spacer, connecting the first glass layer and the second glass layer.

Preferably, the first glass layer and the second glass layer have a hollow layer between them.

Preferably, the second glass layer is the low-emissivity easy-clean glass as described above.

Additionally, the directions or terms such as front, back, left, right, top, bottom, inside, outside, side, etc., mentioned herein are mainly based on the directions shown in the drawings and are used to aid in the description and understanding of the various embodiments of the invention, and are not intended to limit the invention. Furthermore, the use of articles such as "a" or "the" in the elements or components described herein is intended to simplify the description and should be interpreted to include one or at least one, and a single concept also includes plural situations unless clearly indicated otherwise.

BRIEF DESCRIPTION OF DRAWINGS

The embodiments of the present invention will be described with reference to the following brief descriptions and accompanying drawings.

DETAILED DESCRIPTION OF THE INVENTION

Figure 1:
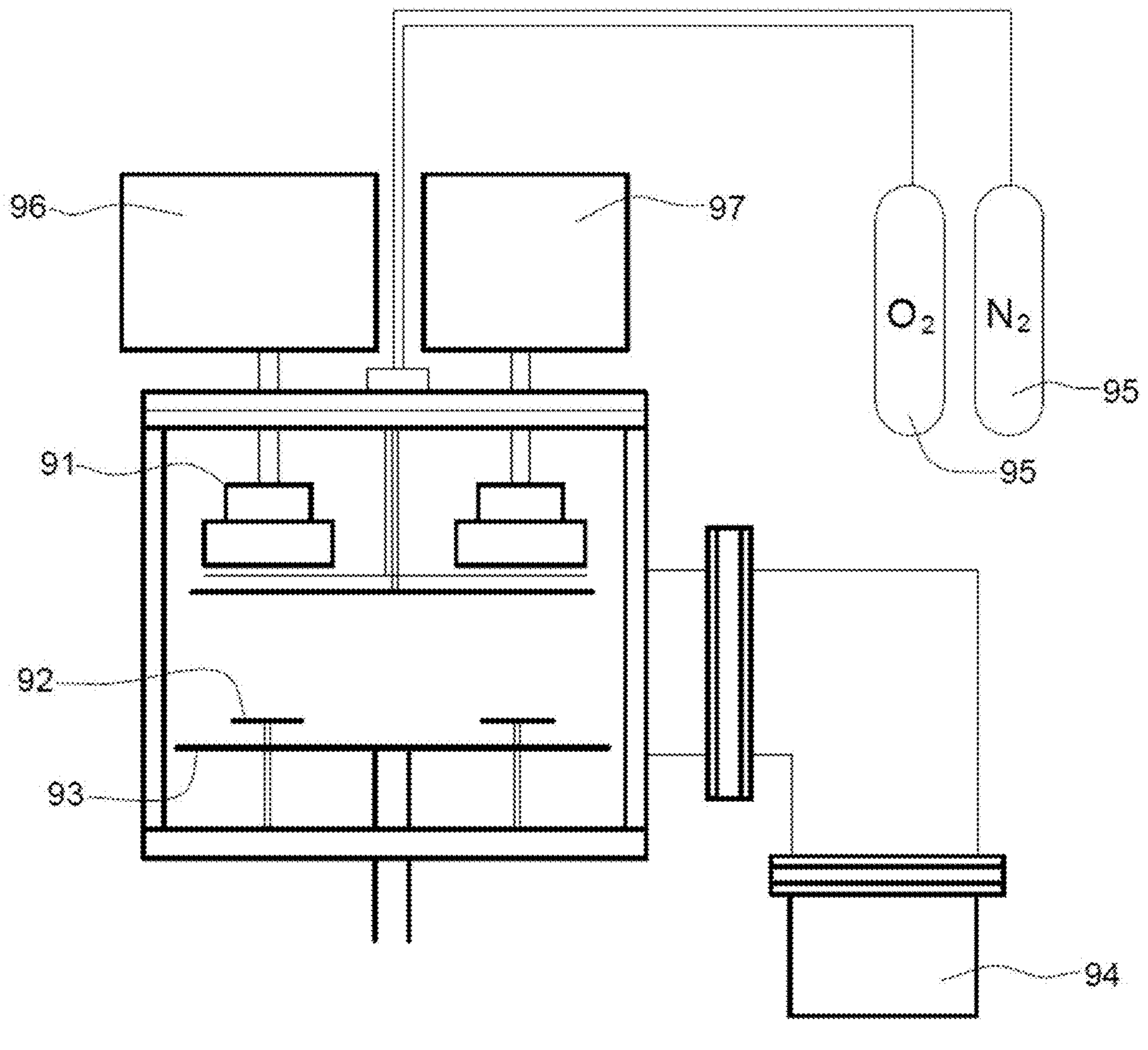
FIG. 1: Schematic diagram of the sputtering system in an embodiment.

To make the above and other objectives, features, and advantages of the present invention more apparent, the following preferred embodiments are described in detail with reference to the accompanying drawings. The same symbols in different drawings can be considered identical and their descriptions may be omitted.

The coating methods for Low-E (Low-Emissivity) coated glass are commonly divided into two types: hard coating and soft coating.

Hard Low-E Glass can be used as single-layer, laminated, or multi-layer combinations, and it can be directly heat-strengthened and bent, making it very convenient to use. The manufacturing method mainly uses a pyrolytic process, where the Low-E film material is sprayed onto the forming high-temperature flat glass after the glass ribbon leaves the furnace. This Low-E coating method, because it is connected with the glass production line, is also known as online Low-E coated glass.

Soft Low-E Glass, on the other hand, because the coating metal layer is not resistant to high temperatures and is easily oxidized, is not suitable for long-term exposure to air. However, its excellent insulation effect makes it a good choice for making multi-layer glass materials. The manufacturing method uses a vacuum coating process, or sputtering/magnetron sputtering method on flat glass to prepare multi-layer metal or ceramic films, also known as offline Low-E coated glass.

This embodiment provides a method for manufacturing low-emissivity easy-clean glass, comprising: using RF (Radio Frequency) sputtering of a silicon oxide target while simultaneously introducing nitrogen gas and using DC (Direct Current) sputtering of a silver target to co-deposit nitrogen-doped silicon oxide silver (Si, O, N: Ag) on a glass substrate. This can avoid oxidation issues while improving conductivity, hardness, water contact angle, and reducing hemispherical emissivity.

In a vacuum, high-energy positive ions accelerated by a high-voltage electric field strike the solid surface, causing atoms and molecules on the solid surface to exchange kinetic energy with these high-energy incident particles and be released from the solid surface. This phenomenon is called sputtering. When sputtered atoms reach the substrate surface and undergo thin film deposition, this process is called sputtering deposition.

In a DC sputtering system, if the target to be sputtered is an insulator, the target surface does not conduct well and accumulates positive charges under continuous bombardment. As the positive charge accumulation on the target surface increases, its potential rises continuously until it reaches zero, causing the glow discharge phenomenon to disappear, making it difficult to sputter low-conductivity materials. Using an AC power source can solve this problem, where positive and negative voltage swaps can neutralize the accumulated positive charge on the target surface by electron collision. However, if the AC power frequency is not high enough, the half-cycle is too short to neutralize the accumulated charge on the target surface, and the glow discharge cannot continue for long. In this case, using an RF (Radio Frequency) power source with a frequency greater than 1 MHz to switch the positive and negative poles of the AC power can avoid charge accumulation problems even if the target is a non-conductor.

FIG. 1 is a schematic diagram of the sputtering system in this embodiment. The sputtering system mainly includes a sputtering gun (91), a sputtering base (92), a sputtering turntable (93), a pump (94), a gas cylinder (95), an RF generator (96), and a DC generator (97).

First, prepare a silicon oxide target, a silver target, a glass substrate (Corning glass, 5 mm thick), and nitrogen gas. Then, use the pump to evacuate to a vacuum of 2×10^−6 mmHg or below and maintain this vacuum. During sputtering, control the working pressure of the introduced nitrogen gas at 3.5~3.7×10^−3 mmHg, with a working distance of 200 mm, a glass substrate rotation speed of 20 rpm, and a deposition time fixed at 1 hour.

The preferred pump is a mechanical pump or a turbomolecular pump.

Preferably, this embodiment's method for manufacturing low-emissivity easy-clean glass further comprises: annealing to obtain a low-emissivity easy-clean glass, wherein the low-emissivity easy-clean glass has a nitrogen-doped silicon oxide silver (Si, O, N: Ag) thin film layered on the glass substrate. Thus, the low-emissivity easy-clean glass is obtained. The single-layer nitrogen-doped silicon oxide silver (Si, O, N: Ag) thin film of the low-emissivity easy-clean glass has a hardness greater than 2H and a contact angle greater than 103 degrees.

Generally, sputtering without heating cannot provide enough energy for the deposited particles to diffuse, making it difficult for the particles to reach their appropriate positions in the structure, thus preventing the formation of a more complete crystal structure. After annealing, the thermal effect generated in the thin film can rearrange the atoms in the thin film to reduce defects, enlarge the crystal grains, and improve the crystallinity of the film. This densification can also activate carriers, increase carrier concentration, and improve electron mobility, thereby increasing conductivity.

The annealing process in the prior art usually involves inert gases such as argon or nitrogen to reduce secondary reactions. Sometimes forming gas, a mixture of hydrogen and nitrogen, is used to reduce the oxygen molecule content in the thin film through the reducing power of hydrogen.

Preferably, the annealing step in this embodiment includes: introducing oxygen to perform annealing. During the sputtering process, oxygen vacancies are formed. Annealing with the introduction of oxygen can fill these vacancies, further reducing defects and making the structure more perfect, lowering binding energy and further increasing conductivity.

Preferably, this embodiment can again use RF sputtering of a silicon oxide target while simultaneously introducing nitrogen gas and using DC sputtering of a silver target to co-deposit another layer of nitrogen-doped silicon oxide silver (Si, O, N: Ag). Then, anneal again to obtain low-emissivity easy-clean glass with two layers of nitrogen-doped silicon oxide silver (Si, O, N: Ag) thin films stacked on each other. This double-layer nitrogen-doped silicon oxide silver (Si, O, N: Ag) thin film low-emissivity easy-clean glass has a hardness greater than 5H and a contact angle greater than 110 degrees.

Figure 2:
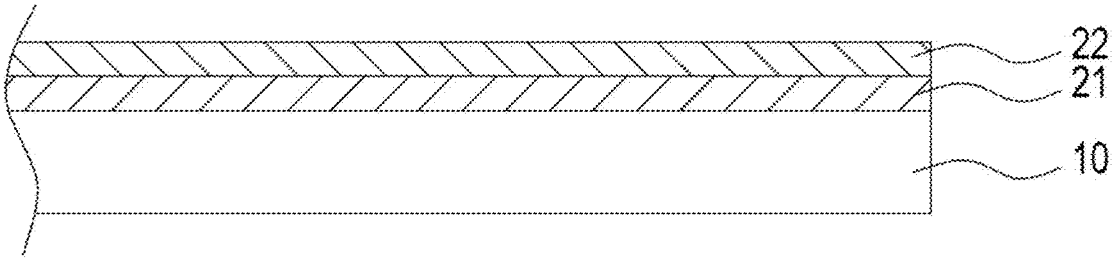
FIG. 2: The low-emissivity easy-clean glass in an embodiment.
Figure 3:
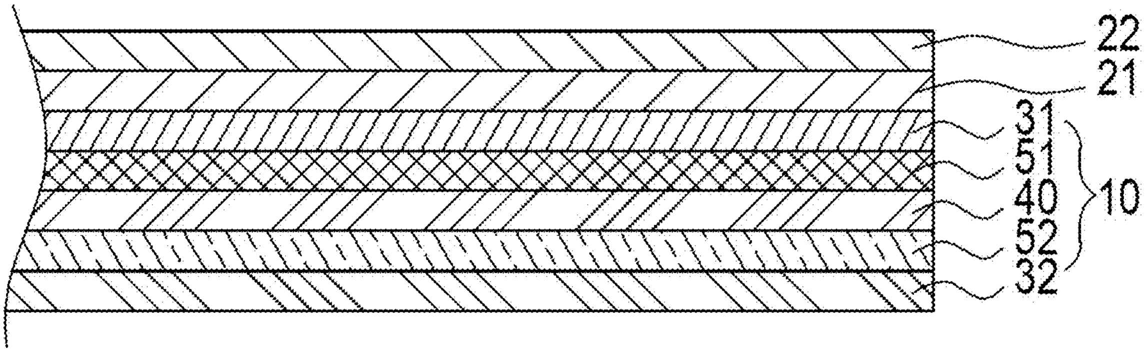
FIG. 3: Another embodiment of the low-emissivity easy-clean glass.

FIG. 2 is the low-emissivity easy-clean glass in this embodiment. FIG. 3 is another embodiment of the low-emissivity easy-clean glass.

As shown in FIG. 2, this embodiment of low-emissivity easy-clean glass comprises: a first nitrogen-doped silicon oxide silver layer (21); and a glass substrate (10), wherein the first nitrogen-doped silicon oxide silver layer (21) is co-deposited on the glass substrate (10). The hardness of this low-emissivity easy-clean glass is greater than 2H, and the contact angle is greater than 103 degrees.

Preferably, this embodiment of low-emissivity easy-clean glass further comprises a second nitrogen-doped silicon oxide silver layer (22), co-deposited on the first nitrogen-doped silicon oxide silver layer (21). As shown in FIG. 1, the double-layer nitrogen-doped silicon oxide silver (Si, O, N: Ag) thin film of the low-emissivity easy-clean glass has a hardness greater than 5H and a contact angle greater than 110 degrees.

Preferably, the glass substrate (10) is 5 mm thick. Of course, common choices also include 1.7 mm, 6 mm, and 8 mm.

As shown in FIG. 3, another embodiment of low-emissivity easy-clean glass comprises: a first nitrogen-doped silicon oxide silver layer (21); a second nitrogen-doped silicon oxide silver layer (22), wherein the second nitrogen-doped silicon oxide silver layer (22) is co-deposited on the first nitrogen-doped silicon oxide silver layer (21); and a glass substrate (10), wherein the first nitrogen-doped silicon oxide silver layer (21) is co-deposited on the glass substrate (10).

Another embodiment of the glass substrate (10) comprises: a first transparent substrate layer (31); a second transparent substrate layer (32); a near-infrared shielding layer (40) positioned between the first transparent substrate layer (31) and the second transparent substrate layer (32), the near-infrared shielding layer (40) comprising multiple tungsten oxide nanoparticles fixed in polyethylene terephthalate (PET); a first protective layer (51), positioned between the first transparent substrate layer (31) and the near-infrared shielding layer (40), the first protective layer (51) being a polyethylene terephthalate layer; and a second protective layer (52), positioned between the second transparent substrate layer (32) and the near-infrared shielding layer (40), the second protective layer (52) being a polyethylene terephthalate layer.

Preferably, the first transparent substrate layer (31) and the second transparent substrate layer (32) are glass.

Table 1 shows the comparative data of the examples and embodiments.

TABLE 1

| Test Item | Comparative Example 1 | Comparative Example 2 | Embodiment 1 | Embodiment 2 |
|---|---|---|---|---|
| Hemispherical Emissivity | 0.88 | 0.176 | 0.25 | 0.21 |
| Hardness | 9H | <6B | 5~6H | 2~3H |
| Water Contact Angle | 16 | 67 | 110 | 103 |

TABLE 1-continued

| Test Item | Comparative Example 1 | Comparative Example 2 | Embodiment 1 | Embodiment 2 |
|---|---|---|---|---|
| Substrate (5 mm) | Clear Glass | Single-layer Coated Silver Glass | Single-layer Silver Glass | Double-layer Silver Glass |

In summary, compared to the prior art, which has adverse side effects such as decreased conductivity, hardness, and water contact angle, and increased hemispherical emissivity, the embodiment of the present invention provides a method for manufacturing low-emissivity easy-clean glass and the resulting low-emissivity easy-clean glass, which avoids oxidation issues while improving conductivity, hardness, and water contact angle, and reducing hemispherical emissivity.

Additionally, if thermal insulation, rather than sound insulation, is considered, the low-emissivity easy-clean glass of this embodiment can also be applied to low-emissivity easy-clean composite glass.

Figure 4:
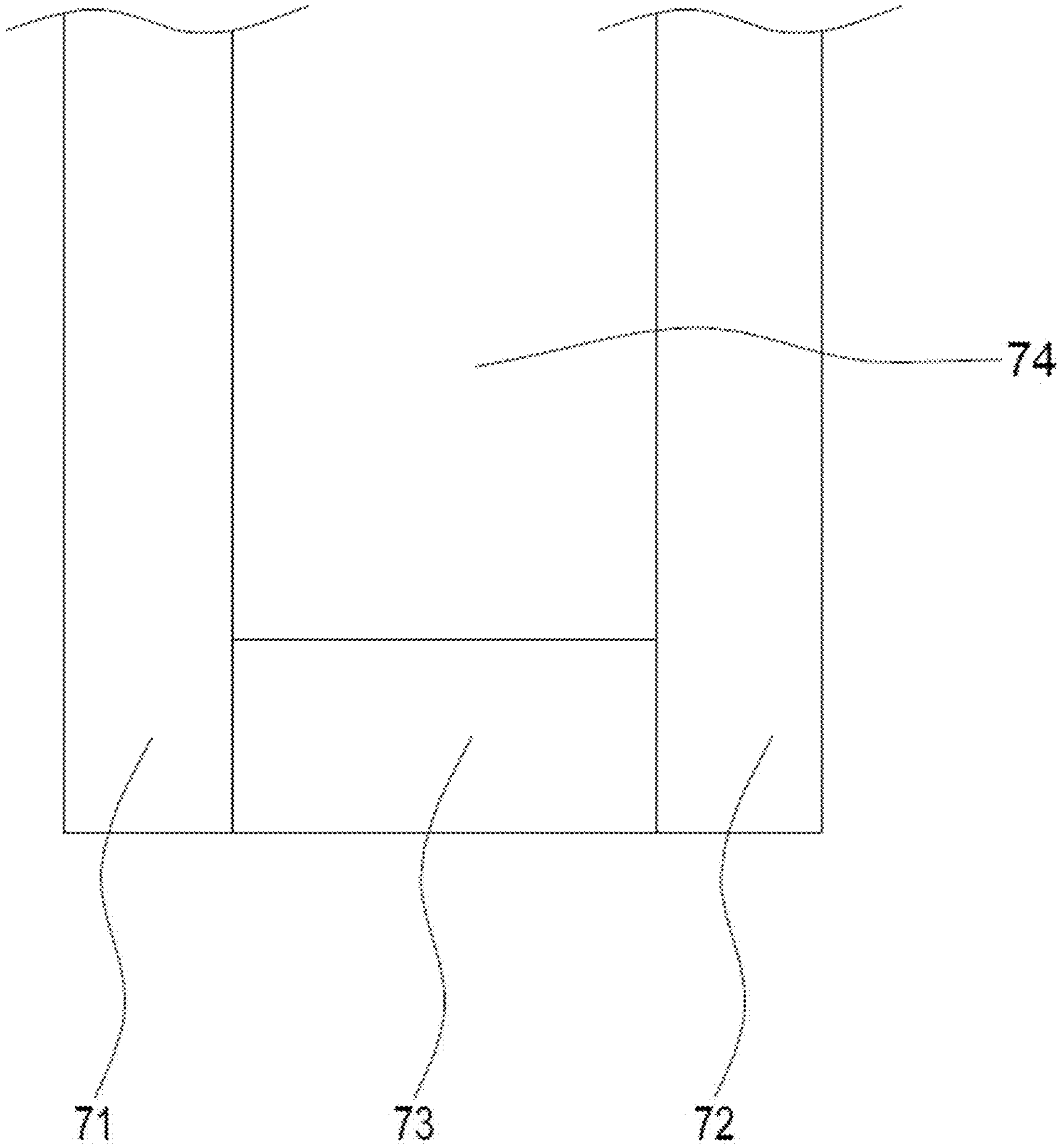
FIG. 4: The low-emissivity easy-clean composite glass in an embodiment of the present creation.

FIG. 4 shows the low-emissivity easy-clean composite glass in this embodiment. As shown in FIG. 4, this embodiment of low-emissivity easy-clean composite glass comprises: a first glass layer (71), the first glass layer (71) being the low-emissivity easy-clean glass as described above; a second glass layer (72); and a spacer (73), connecting the first glass layer (71) and the second glass layer (72).

Preferably, the first glass layer (71) and the second glass layer (72) have a hollow layer (74) between them.

Preferably, the second glass layer (72) is the low-emissivity easy-clean glass as described above.

Thus, this creation not only enhances the thermal insulation effect but also improves the sound insulation effect.

Although the present invention has been disclosed through the above preferred embodiments, it is not intended to limit the invention. Any changes and modifications made by those skilled in the art without departing from the spirit and scope of the present invention are still within the scope of the protection of the present invention. Therefore, the scope of protection of the present invention shall include all variations within the scope of the appended claims and their equivalents. When the above embodiments can be combined, the present invention includes any combination of embodiments.

DESCRIPTION OF REFERENCE NUMERALS

Symbols Used in the Present Invention:

Glass layer (10)
First nitrogen-doped silicon oxide silver layer (21)
Second nitrogen-doped silicon oxide silver layer (22)
First transparent substrate layer (31)
Second transparent substrate layer (32)
Near-infrared shielding layer (40)
First protective layer (51)
Second protective layer (52)
First glass layer (71)
Second glass layer (72)
Spacer (73)
Sputtering gun (91)
Sputtering base (92)
Sputtering turntable (93)
Pump (94)
Gas cylinder (95)
RF generator (96)
DC generator (97)

The invention claimed is:

1. A low-emissivity easy-clean glass, comprising:
a first nitrogen-doped silicon oxide silver layer (21); and
a glass substrate (10) on which the first nitrogen-doped silicon oxide silver layer (21) is formed.

2. The low-emissivity easy-clean glass of claim 1, wherein the glass further comprises:
a second nitrogen-doped silicon oxide silver layer (22), formed on the first nitrogen-doped silicon oxide silver layer (21).

3. The low-emissivity easy-clean glass of claim 1, wherein the low-emissivity easy-clean glass has a hardness greater than 2H and a contact angle greater than 103 degrees.

4. The low-emissivity easy-clean glass of claim 1, wherein the low-emissivity easy-clean glass has a hardness greater than 5H and a contact angle greater than 110 degrees.

5. The low-emissivity easy-clean glass of claim 1, wherein the glass substrate (10) comprises:
a first transparent substrate layer (31);
a second transparent substrate layer (32);
a near-infrared shielding layer (40), positioned between the first transparent substrate layer (31) and the second transparent substrate layer (32), the near-infrared shielding layer (40) comprising multiple tungsten oxide nanoparticles fixed in polyethylene terephthalate (PET);
a first protective layer (51), positioned between the first transparent substrate layer (31) and the near-infrared shielding layer (40), the first protective layer (51) being a polyethylene terephthalate layer; and
a second protective layer (52), positioned between the second transparent substrate layer (32) and the near-infrared shielding layer (40), the second protective layer (52) being a polyethylene terephthalate layer.

6. The low-emissivity easy-clean glass of claim 5, wherein the first transparent substrate layer (31) and the second transparent substrate layer (32) are glass.

7. A low-emissivity easy-clean composite glass, comprising:
a first glass layer (71), being the low-emissivity easy-clean glass of claim 1;
a second glass layer (72); and
a spacer (73), connecting the first glass layer (71) and the second glass layer (72).

8. The low-emissivity easy-clean composite glass of claim 7, wherein the first glass layer (71) and the second glass layer (72) have a hollow layer (74) between them.

9. The low-emissivity easy-clean composite glass of claim 7, wherein the second glass layer (72) is the low-emissivity easy-clean glass.

10. A method for manufacturing low-emissivity easy-clean glass, comprising:
using RF (Radio Frequency) sputtering of a silicon oxide target while simultaneously introducing nitrogen gas and using DC (Direct Current) sputtering of a silver target to co-deposit nitrogen-doped silicon oxide silver (Si, O, N: Ag) on a glass substrate.

11. The method of claim 10, wherein the method further comprises:
annealing to obtain a low-emissivity easy-clean glass, wherein the low-emissivity easy-clean glass has a nitrogen-doped silicon oxide silver (Si, O, N: Ag) thin film layered on the glass substrate.

12. The method of claim 11, wherein the method further comprises:
using RF sputtering of a silicon oxide target while simultaneously introducing nitrogen gas and using DC sputtering of a silver target to co-deposit another layer of nitrogen-doped silicon oxide silver (Si, O, N: Ag) on the glass substrate.

13. The method of claim 12, wherein the method further comprises:

annealing again to obtain low-emissivity easy-clean glass with two layers of nitrogen-doped silicon oxide silver (Si, O, N: Ag) thin films stacked on each other.

14. The method of claim 13, wherein the annealing step comprises:

introducing oxygen and performing annealing.

15. The method of claim 13, wherein the low-emissivity easy-clean glass has a hardness greater than 2H and a contact angle greater than 103 degrees.

16. The method of claim 11, wherein the annealing step comprises:

introducing oxygen and performing annealing.

17. The method of claim 11, wherein the low-emissivity easy-clean glass has a hardness greater than 2H and a contact angle greater than 103 degrees.

18. The method of claim 11, wherein the low-emissivity easy-clean glass has a hardness greater than 5H and a contact angle greater than 110 degrees.

19. The method of claim 10, wherein the method further comprises:

maintaining a vacuum of 2×10^ −6 mmHg or below before sputtering.

20. The method of claim 10, wherein the method further comprises:

maintaining a working pressure of nitrogen gas at 3.5~3.7×10^ −3 mmHg during sputtering.

* * * * *